Aug. 8, 1961  V. W. WEST  2,995,229
COIN CONTROLLED FLUID DISPENSING APPARATUS
Filed Jan. 14, 1959  7 Sheets-Sheet 1
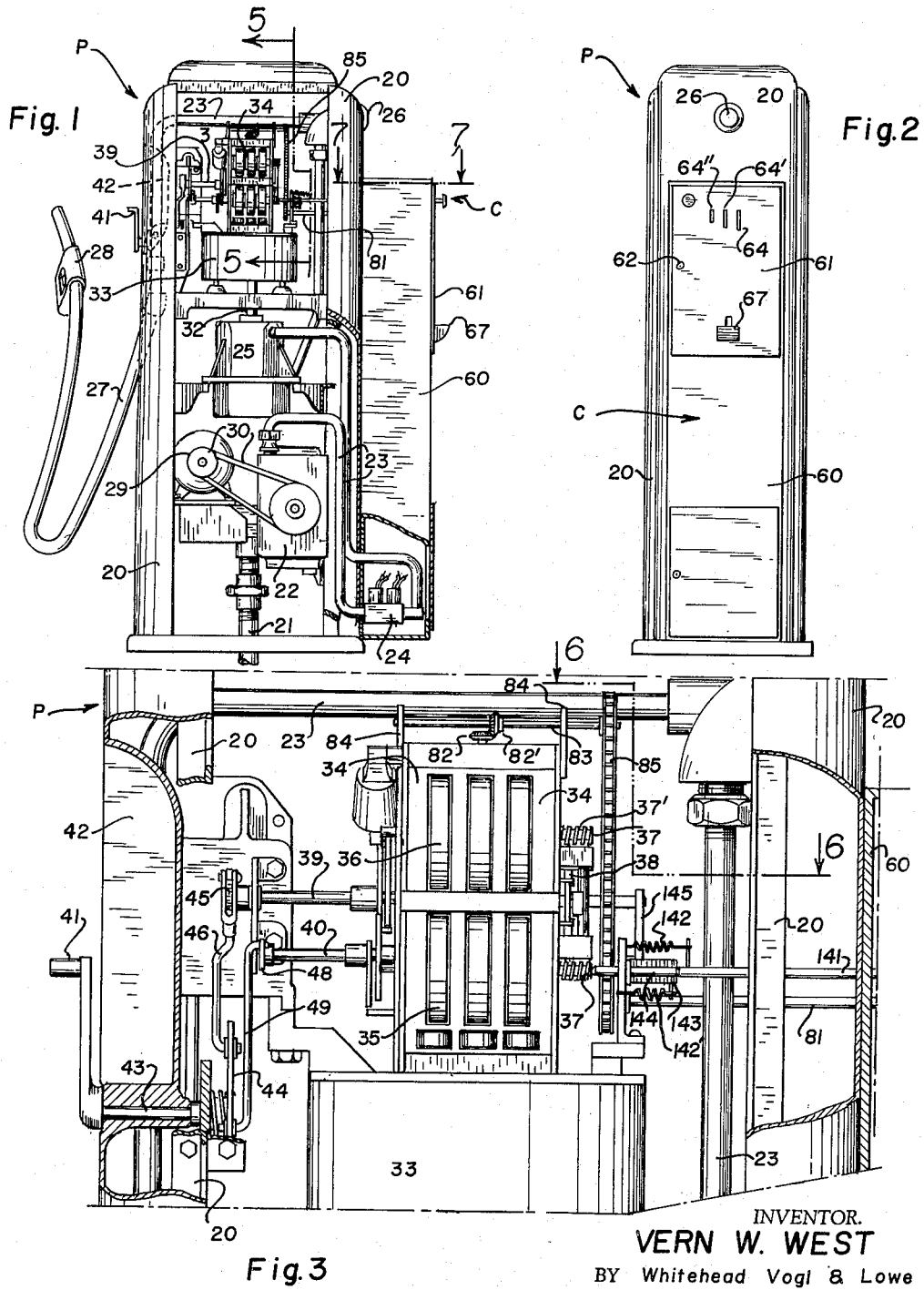
INVENTOR.
VERN W. WEST
BY Whitehead Vogl & Lowe
Per Frank C. Lowe
Attorneys

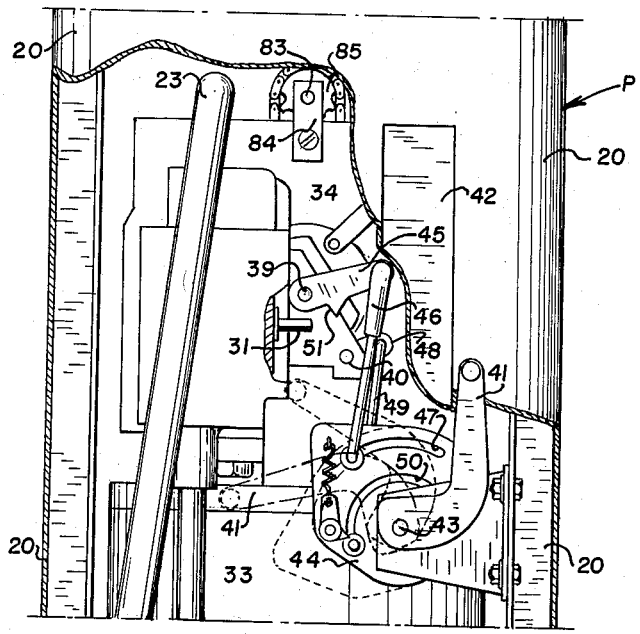
Fig. 4
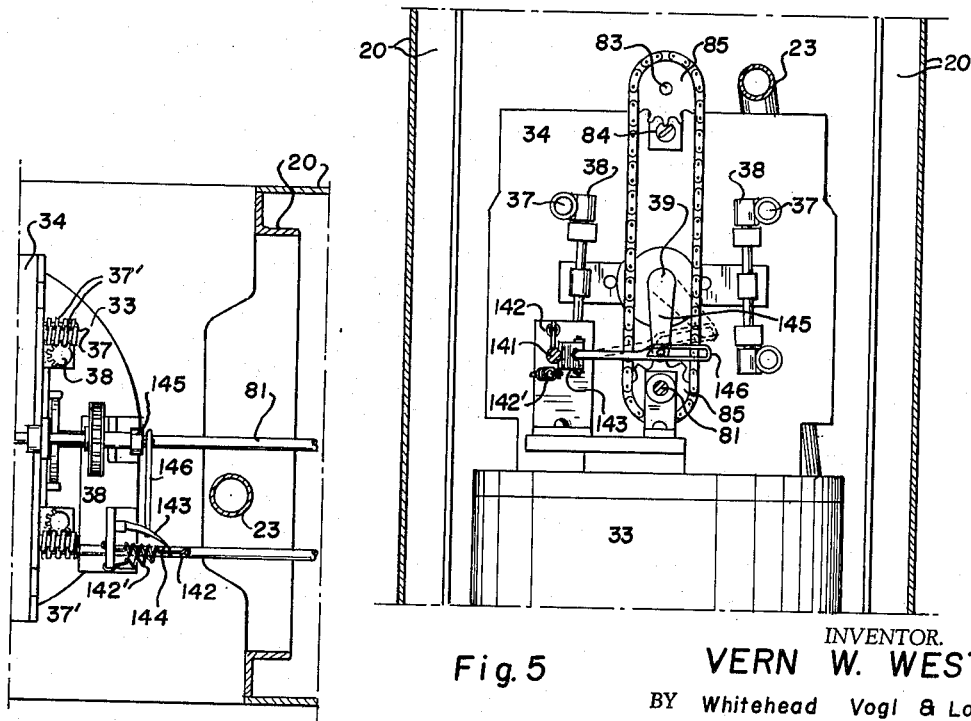
Fig. 5
Fig. 6
INVENTOR.
VERN W. WEST
BY Whitehead Vogl & Lowe
Per Frank C. Lowe
Attorneys Aug. 8, 1961 V. W. WEST 2,995,229
COIN CONTROLLED FLUID DISPENSING APPARATUS
Filed Jan. 14, 1959 7 Sheets-Sheet 3

INVENTOR.
VERN W. WEST
BY Whitehead Vogl & Lowe
Per Frank C. Lowe
Attorneys

INVENTOR.
VERN W. WEST
BY Whitehead Vogl & Lowe
Per Frank C. Lowe
Attorneys.

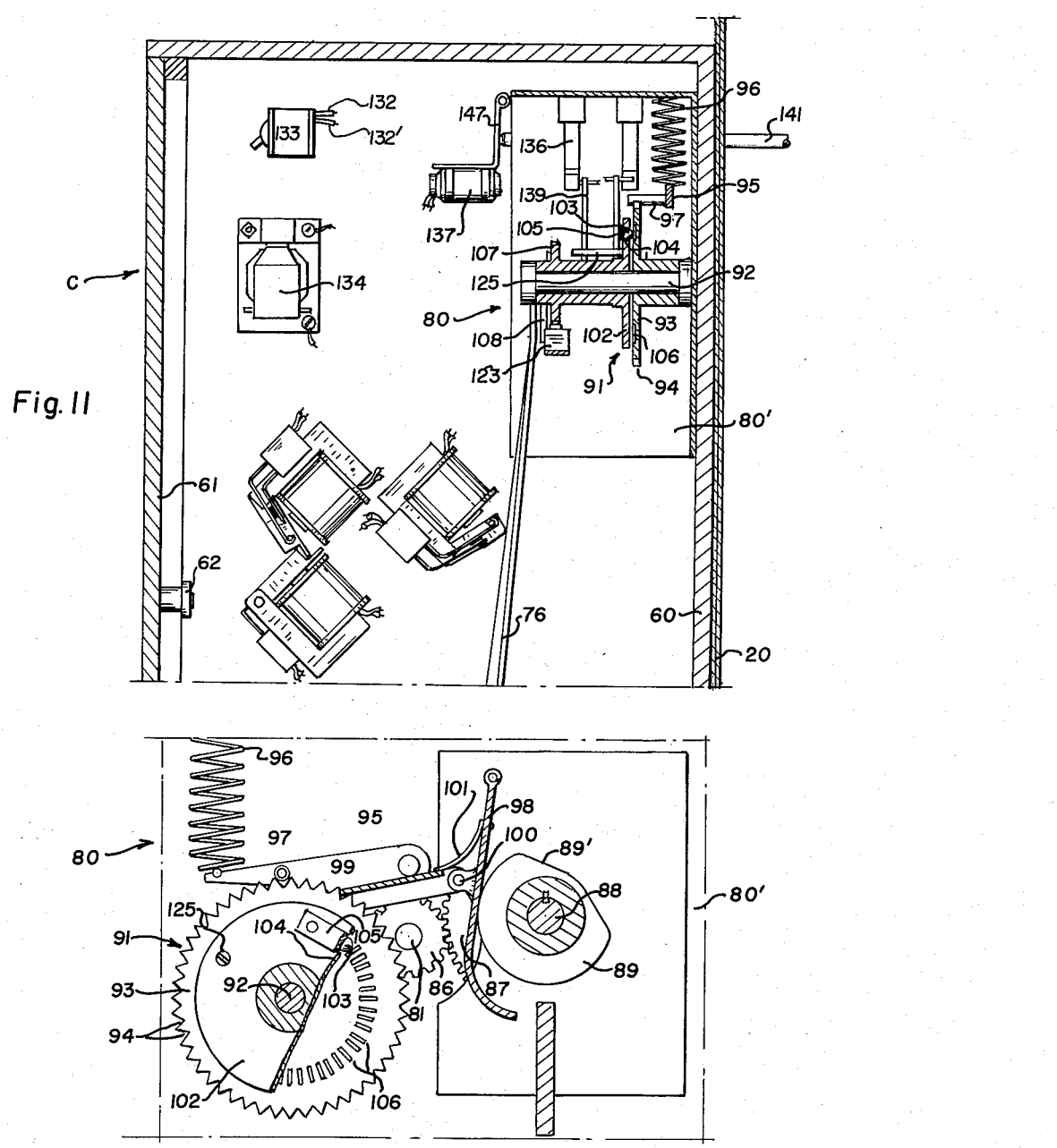

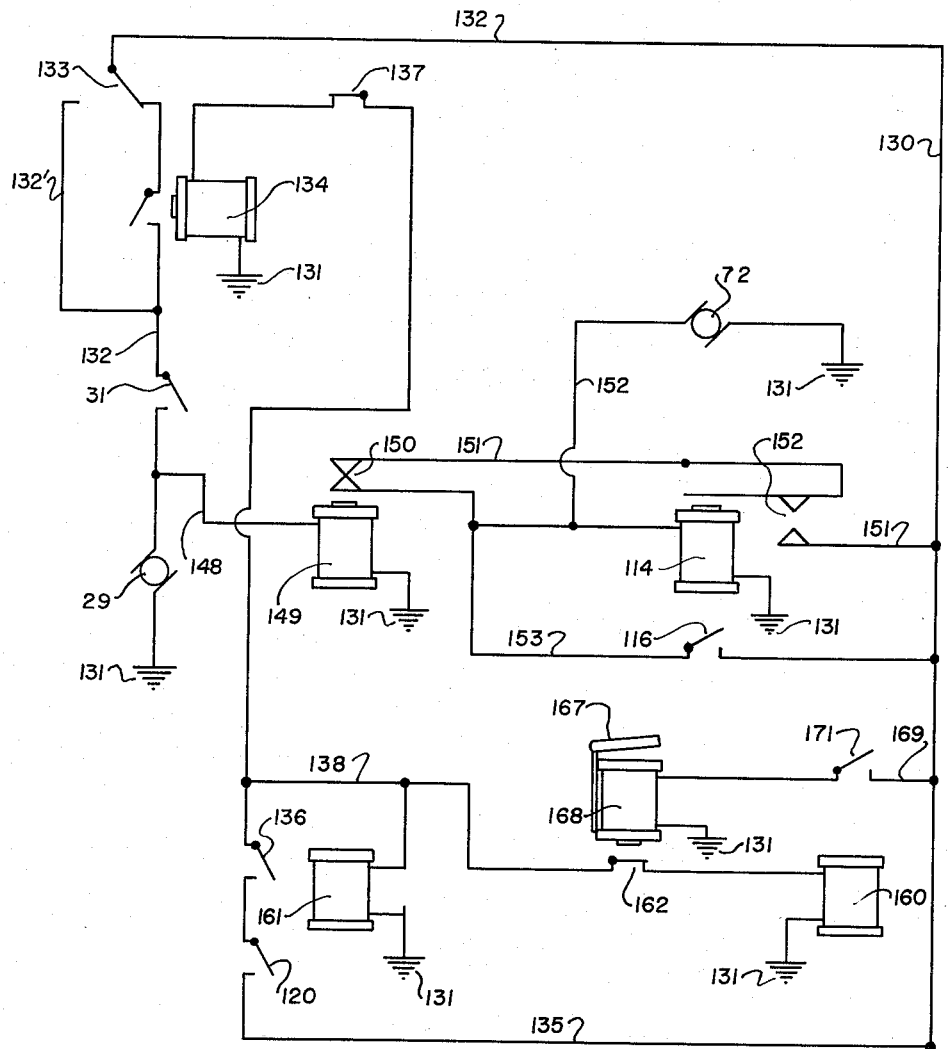
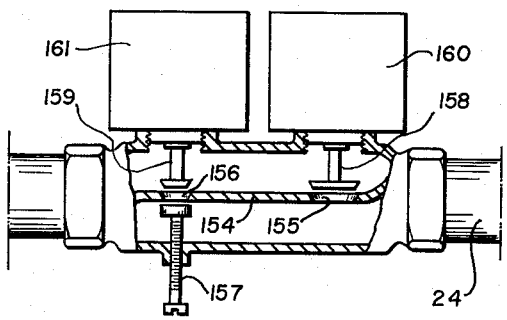
Fig. 13
Fig. 14
INVENTOR.
VERN W. WEST
BY Whitehead Vogl & Lowe
Per Frank C. Lowe
Attorneys United States Patent Office 2,995,229
Patented Aug. 8, 1961

2,995,229
COIN CONTROLLED FLUID DISPENSING APPARATUS
Vern W. West, 1307 N. College Ave., Fort Collins, Colo.
Filed Jan. 14, 1959, Ser. No. 786,807
3 Claims. (Cl. 194—1)

This invention relates to means and apparatus for the vending and dispensing of fluids such as gasoline and diesel fuel and more particularly to such apparatus which is operable to automatically deliver and meter the given quantity of fluid, such as gasoline, and register the amount and value of the fluid delivered. The primary object of the invention is to provide novel and improved coin operated means associated with such dispensing apparatus adapted to initiate the dispensing of fluid, hereinafter referred to as gasoline, through the actuation of a standard coin and effect the delivery of a quantity of gasoline which is proportioned to the value of the coin.

The dispensing apparatus with which the present invention is associated is commonly known as automatic reset computer pump since the dials which indicate the amount and value of fluid delivered may be automatically reset to zero indications after each delivery therefrom. Such a pump is commonly called, and will be hereinafter referred to as, a computer pump. It follows that another object of the invention is to provide a novel and improved coin operated computer pump.

Another object of the invention is to provide a novel and improved coin operated computer pump which is adapted to receive a plurality of standard coins to initiate operation of the pump and to dispense a quantity of gasoline proportioned to the value of the sum of coins received.

Another object of the invention is to provide a novel and improved coin operated computer pump which is adapted to receive a plurality of standard coins of varying value to initiate operation of the pump and to permit the dispensing of a quantity of gasoline proportioned to the sum of the coins received.

Another object of the invention is to provide, in a coin operated computer pump which is adapted to receive a plurality of standard coins to initiate the operation of the pump and to permit dispensing of a selected quantity of gasoline proportioned to the value of the sum of the coins received, an interlocking means within the apparatus thereof which prevents accidental insertion of coins while delivery is being effected and otherwise prevents an excess or deficiency of gasoline delivered over the selected quantity.

Another object of the invention is to provide, in a computer pump, a coin controlling means including an accumulator which interconnects the computing meter of the pump with the coin receiving element of the apparatus to add in the value of coins deposited into the apparatus and subtract out the value of fluid dispensed from the pump.

Yet another object of the invention is to provide, in a coin operated computer pump, a novel and improved interlocking control means which permits a normal sequence of pumping operations, responsive to the deposit of coins therein, to pump a selected amount of gasoline determined by the value of the coins deposited, and prevents any overlapping operation and manipulation which would creat an excess or deficiency of the fuel quantity pumped.

Yet another object of the invention is to provide, in combination with a computer pump, a coin operated controlling means which is operatively interconnected with the dispensing control of the pump and with the computing elements thereof to interassociate the dispensing of the gasoline therefrom with the computing elements thereof all being operable in accordance with indications within the means established by the deposit of the selected number of coins therein.

Yet other objects of the invention are to provide in a novel and improved coin operated computer pump an arrangement of elements which is simple and inexpensive in construction and installation, reliable in operation, easily adjusted and maintained, which may have the automatic features disconnected for manual operation and which requires a minimum of maintenance for efficient operation through long periods of use.

With the foregoing and other objects in view, all of which more fully hereinafter appear, my invention comprises certain novel and improved constructions, combinations and arrangements of parts and elements as will be hereinafter more fully described, defined in the appended claims and illustrated in the accompanying drawing in which:

FIGURE 1 is a front elevation view of a common type of computer pump for dispensing gasoline, modified and arranged in accordance with the principles of the invention to include a coin operated control means therewithin, the drawing illustrating portions of the pump case as being removed and with other portions being partly in section to show elements and parts otherwise hidden from view.

FIGURE 2 is a side elevation view of the computer pump as taken from the indicated arrow 2 at FIG. 1.

FIGURE 3 is an enlarged fragmentary portion of the showing at FIG. 1 to better illustrate the conventional computing head assemblage and the interconnection of elements constituting the invention therewith, with portions of the pump frame being removed, and other portions being in section to show elements otherwise hidden from view.

FIGURE 4 is an enlarged, fragmentary, side elevation view of the pump to more fully illustrate conventional computer head controls which interact with elements constituting the invention, as taken from the indicated arrow 4 at FIG. 1, but on an enlarged scale and with portions of the pump frame being broken away to show elements otherwise hidden from view.

FIGURE 5 is a fragmentary, sectional elevation view as taken from the indicated line 5—5 at FIG. 1, but on an enlarged scale.

FIGURE 6 is a fragmentary, sectional plan view as taken from the indicated line 6—6 at FIG. 3.

FIGURE 11 is a fragmentary, sectional elevation view as taken from the indicated line 11—11 at FIG. 9.

FIGURE 12 is a fragmentary, sectional detail as taken from the indicated line 12—12 at FIG. 7, but on a further enlarged scale.

FIGURE 13 is a wiring diagram of the apparatus illustrated in the other figures of the drawing.

FIGURE 14 is a sectional view of a differential-flow control valve which is included in this apparatus.

Figure 7:
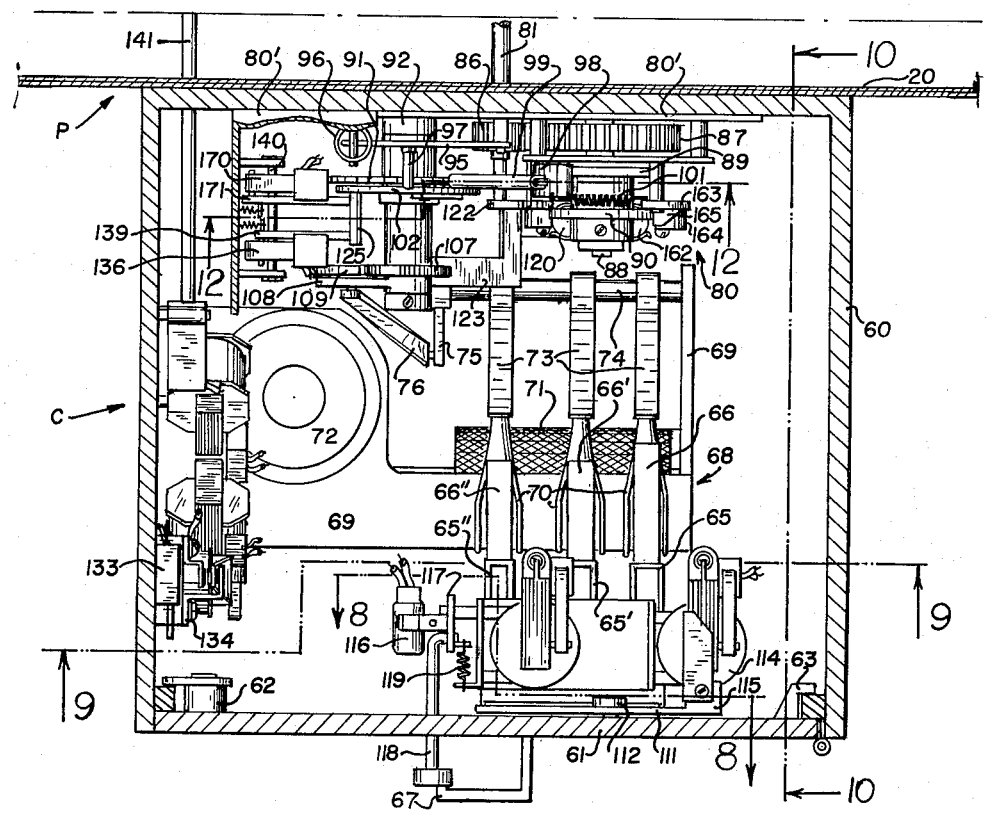
FIGURE 7 is a fragmentary, sectional plan view as taken from the indicated line 7—7 at FIG. 1, but on an enlarged scale.
Figure 8:
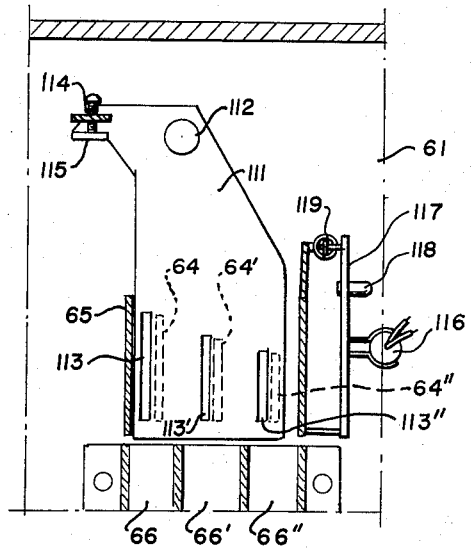
FIGURE 8 is a fragmentary, sectional detail as taken from the indicated line 8—8 at FIG. 7.

Referring more particularly to the drawing, the invention constitutes an improvement in a typical computer pump P by incorporating a coin actuated control therewith as in a case C attached to the body of the pump as illustrated at FIGS. 1 and 2. Suitable cover plates and frame members 20 constitute the body of the pump and enclose and support the operative elements therein, with the edges of the cover plates being curved and with certain cover plates forming offset panels to give the unit a pleasing appearance. Other components of the framework 20 include shelves and buckets which hold the operative elements in position within the computer pump. The coin control case C is attached to the side of the pump body to contain coin regulating mechanism as hereinafter described in detail.

This computer pump is associated with a gasoline supply tank, not shown, which is ordinarily buried in the ground below the pump, and a suction line 21 extends from the supply to and through the bottom of the tank to the intake of a fluid pump 22. A discharge line 23 extends from this pump 22 to a two-stage valve 24 within the case C, as hereinafter further described. From this valve the discharge line 23 returns to the pump and extends to and through a volumetric meter 25, thence to a flow indicating gauge 26 and to a hose 27 which extends outside the frame. A nozzle 28 is located at the discharge end of the hose 27 to complete the conduit through which the gasoline moves.

The pump 22 is driven by an electric motor 29 through a pulley-belt interconnection 30, and means for controlling the electric motor include a conventional motor switch 31 within the pump.

The meter 25 is adapted to drive a shaft 32 which extends upwardly from the meter and to a computer head 33. Movement of gasoline through the meter rotates the drive shaft 32 in proportion to the quantity of gasoline moving through the meter, and this shaft rotates a gear train within the computer head and within an indicator dial case 34 which upstands from the head. Two banks of dials are mounted at each side of this case, one bank above the other. The lower bank of dials 35 is geared to register the volume of gasoline delivered while the upper bank of dials 36 is geared to register the monetary value of the gasoline delivered. These dials operate in unison and are interconnected by gears within the dial case to provide for proper value indication for any given amount of gasoline delivered.

In this conventional unit, the dials in the case 34 are mounted upon reset shafts 37 which are axially shiftable to permit the dials to reset themselves to zero as after a delivery of gasoline. The shafts 37 are formed with threaded stub portion 37' which outstand from the side of the dial case 34 and are operatively interconnected with a shifting mechanism 38 to shift axially, outwardly from the wall of the dial case, as an incident of resetting the dials 35 and 36 to zero. The conventional resetting mechanism within the dial case is operated by rotative shafts including a reset shaft 39 and a release shaft 40. These shafts are, in turn, interconnected with a reset lever 41 which is mounted on the side wall of the pump adjacent to a nozzle retaining pocket 42 in the side wall of the pump body 20. This reset lever is thus arranged in such a manner that it cannot be tripped until the pump nozzle 28 is lifted from its retaining pocket 42.

The reset lever 41 is rotatably mounted upon a shaft 43 which carries a slotted head 44. A linkage interconnects the head 44 with the reset shaft 39 and includes a lever arm 45 attached to the rest shaft 39 and a link bar 46 connecting the lever arm 45 with a slot 47 in the head 44. A linkage also interconnects the head 44 with the release shaft 40 and includes a lever arm 48 attached to the release shaft 40 and a link bar 49 connecting to the lever arm 48 with a slot 50 in the head 44. The slots 47 and 50 are arcuate and extend through selected arcs which permit a sequential operation of first the reset shaft and then the release shaft as the reset lever is swung from a generally vertical position at the side of the nozzle retaining pocket 42, as illustrated in full lines at FIG. 4, to first an intermediate position, as illustrated in dotted lines, and then to a fully depressed position, indicated in broken lines. The motor switch 31 includes an outstanding actuating pin which is depressed by an offset 51 on the reset lever 41, and this motor switch 31 is normally open and closes only when the reset lever is pulled to its fully depressed position.

The case C, containing the coin controlling mechanism, is preferably formed as a box-like unit having comparatively heavy walls 60, a heavy door 61 hinged thereto with a suitable lock 62 and lock lugs 63 of a construction which renders it difficult for the case to be opened or the door broken into by pilferers.

The coin control within this box includes a coin-receiving impulse apparatus and an accumulator which operates responsive to impulses of obth the coin-receiving apparatus and the movement of the computer pump as hereinafter described. In the unit herein illustrated, the coin-receiving apparatus is mounted upon the door 61 and, as illustrated, may receive three different types of coins, such as a dollar, a fifty cent piece, and a quarter. Three slots 64, 64' and 64" are formed in the door 61 wherein the coins may be deposited. Three guide chutes 65, 65' and 65" register with the slots and guide the deposited coins into coin selectors 66, 66' and 66" affixed to the inner wall of the door. These selectors are of conventional construction and are adapted to permit true coins to move to the outer corners of the selectors and counterfeit or defective coins to move to the inward corners at the door. A coin return trough 67 is positioned on the wall below the selectors to receive and return the defective coins.

True coins drop from the selector into an impulser 68 which is adapted to project a thrust bar at selected increments of distance, distances which are proportioned to the value of a coin deposited for actuation of the accumulator as hereinafter described. The impulser 68 is formed upon a suitable transversely mounted base 69 within the frame of the case 60 and a plurality of troughs 70 upstand from this base to receive coins dropped from the selector 66. These troughs 70 are arcuate in path and arch over a knurled drive shaft 71 with their discharge termini at one side of the shaft. The drive shaft 71 is rotated by a motor 72 in a direction which forces the coins through the troughs 70 and past fingers 73 which lie over open portions on the troughs 70 and are lifted by movement of coins. Each finger is adjusted to be lifted a selected distance by movement of a particular coin through the specified trough 70 and the lifting movement is proportioned to the value of the particular coin. These fingers 73 are mounted upon a common, transverse shaft 74 which rotates responsive to lifting movement of the fingers. A lever arm 75 is also attached to the shaft 74 to carry a thrust bar 76 which is connected to the accumulator mechanism and which moves distances proportional to the value of a coin deposited, as in the manner explained.

The accumulator 80 is adapted to correlate the impulse movements from the thrust bar 76 with the operation of the pump itself to add the values of the coins deposited, to subtract values of the gasoline delivered and to shut off the pump when the value of gasoline delivered equals the value of coins deposited. One element of the accumulator includes a subtractor drive shaft 81 which is mounted within the framework of the pump 20 to extend into the case C to the accumulator. This drive shaft 81 is interconnected with the driving mechanisms within the indicator dial case 34. Although such interconnection may vary in arrangement, a preferred arrangement, illustrated at FIG. 3, includes a shaft extension from the top of the case having a bevel gear 82 thereon. This gear 82 is meshed with a mating bevel gear 82' mounted on a transverse shaft 83 in suitable bearing support 84 to overhang one side of the dial case 34 in alignment with the end of the subtractor drive shaft. A sprocket chain assembly 85 interconnects the shaft 83 and the subtractor drive shaft 81 to complete the positive interconnection of the subtractor drive shaft with mechanisms within the computer head 33.

Figure 9:
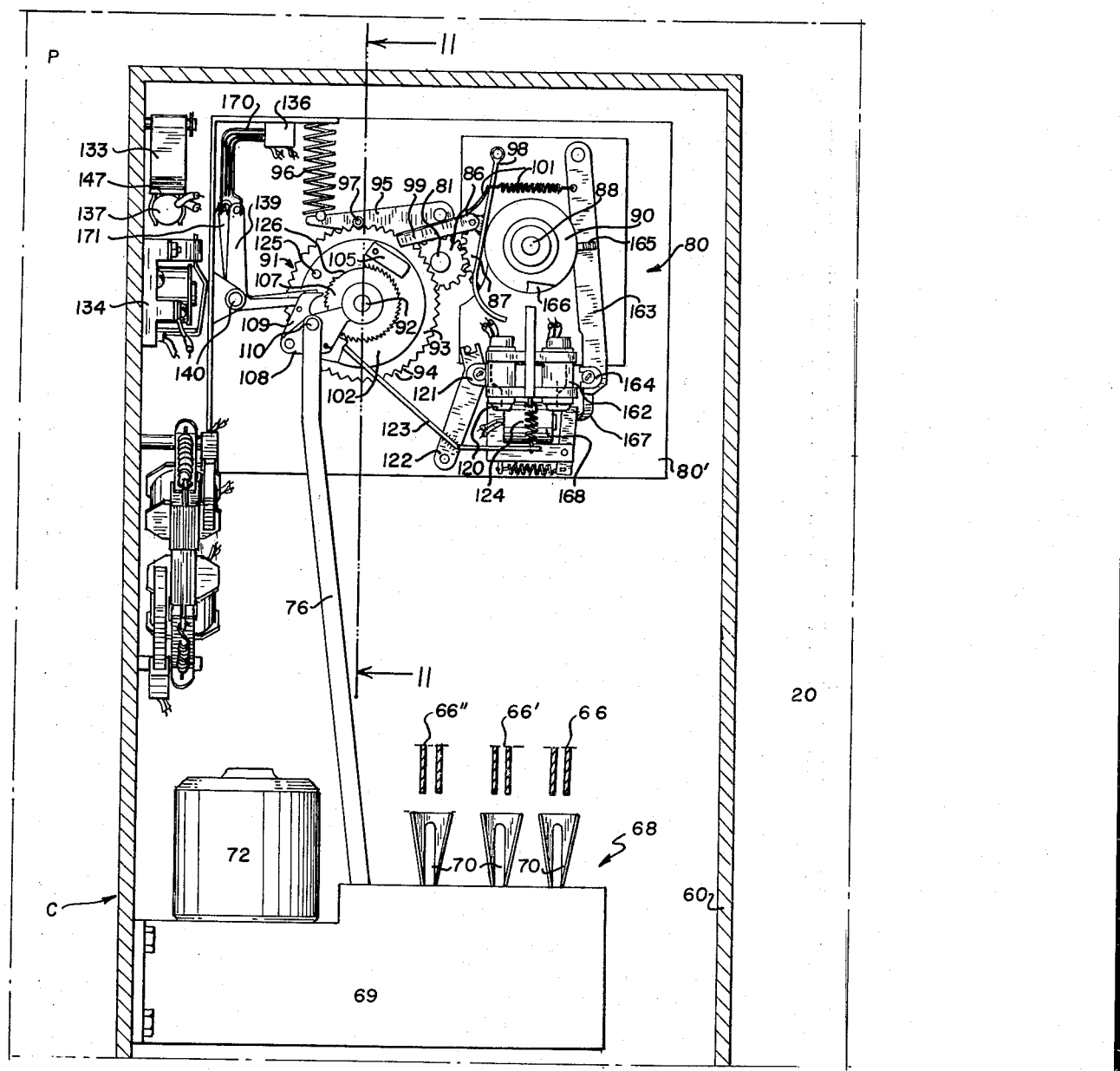
FIGURE 9 is a fragmentary, sectional elevation view as taken from the indicated line 9—9 at FIG. 7.
Figure 10:
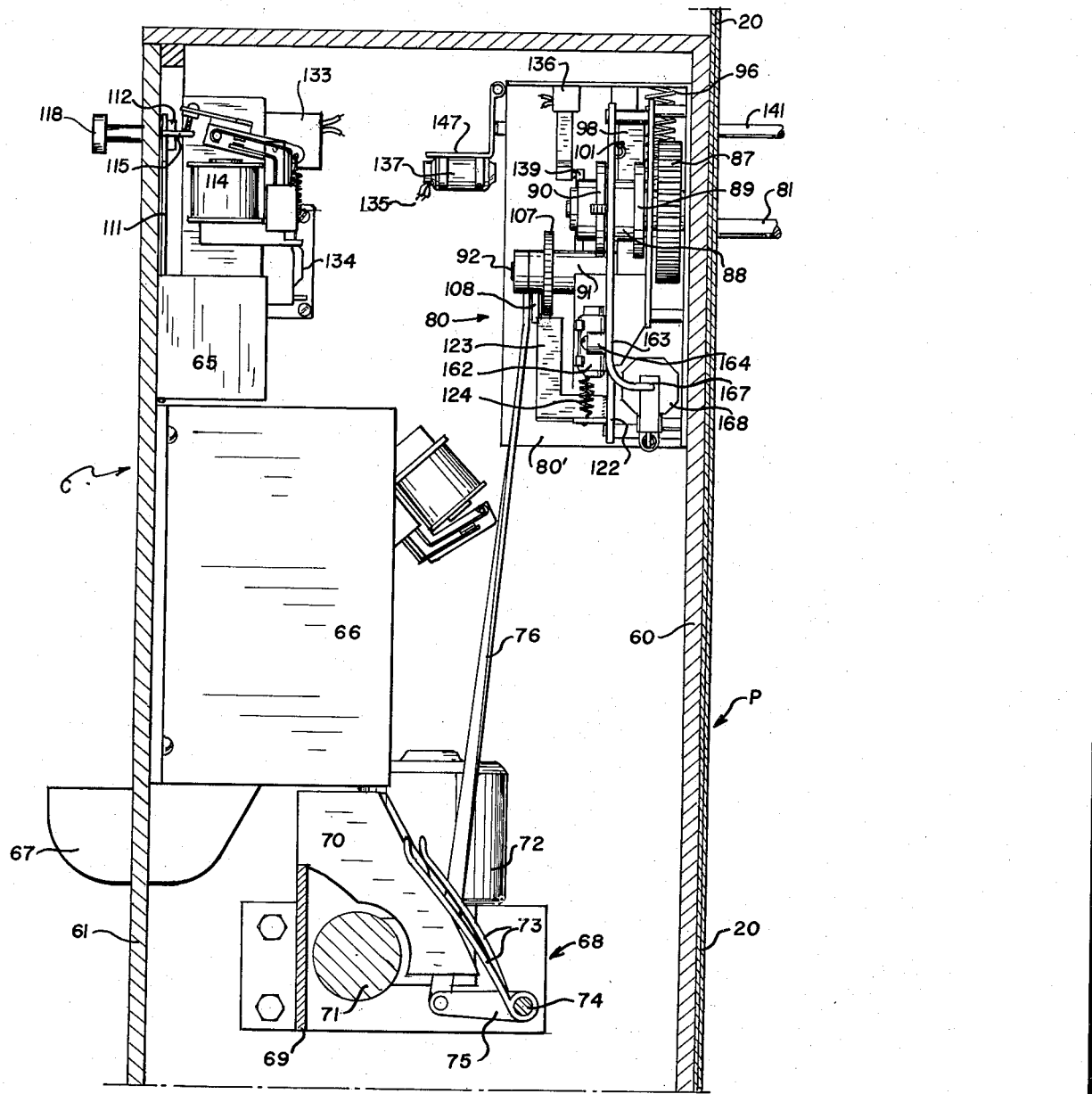
FIGURE 10 is a fragmentary, sectional elevation view as taken from the indicated line 10—10 at FIG. 7.

This drive shaft 81 extends into the framework 80' forming the body of the accumulator 80 within the case C to terminate as a pinion 86. The pinion 86 is connected with a gear 87 which is mounted upon a shaft 88 carried in suitable bearings in the framework 80', and the shaft 88 extends through a portion of the framework 80' to carry a stepping cam 89, illustrated at FIG. 12, and a stopping cam 90, illustrated at FIG. 9. The gearing of the operative train of elements from the bevel gear 82 through the sprocket chain 85, pinion 86, and gear 87 is such that one revolution of the stepping cam will indicate a selected value of gasoline delivered in accordance with the base unit value of the coins which will be deposited in the apparatus. For example, using a base coin arrangement of twenty-five cents, fifty cents, and one dollar, and twenty-five cents as the basic value unit, the gearing will permit one revolution of the shaft 88 for each twenty-five cents of gasoline delivered, as will be registered on the indicator dial case.

A frictionally held interlocking adding and subtracting head 91 is rotatably mounted upon a fixed shaft 92 outstanding from the frame 80' of the accumulator alongside the stepping cam 89. This accumulator head 91 includes a stepper sprocket 93 having a periphery serrated by uniformly spaced teeth 94. The sprocket 93 is resiliently held against rotation by a lever arm 95, which is pivotally mounted to the accumulator frame 80' and held against the sprocket by a spring 96. A lug 97 outstands from the side of the arm 95 to bear against the sprocket in a spacing between adjacent teeth 94. It follows that rotation of this sprocket will move the lug 97 from one tooth space to the other, but a definite force will be required to lift the arm 95 against the push of the spring 96 as the lug is lifted over a tooth 94 to fall into the next adjacent tooth space.

The stepper sprocket 93 is shifted progressively with the lug 97 moving into successive tooth spaces by the movement of the stepping cam 89. This stepping cam is formed with a flat face 89' at one side of its periphery as illustrated at FIG. 12. A follower 98 is pivotally mounted upon the accumulator frame 80' and is adapted to bear against the peripheral edge of the cam 89 to move inwardly when the flat face 89' rotates against the follower 98. A thrust link 99 is pivotally mounted upon an ear 100 of the follower and the extended end of this thrust link bears against a tooth 94 of the sprocket 93. Springs 101 are mounted upon the cam follower 98 to resiliently hold the follower 98 against the periphery of the stepping cam 89 and hold the thrust link against the teeth 94. It follows that rotation of the stepping cam 89 will reciprocate the follower 98 and shift the thrust link 99 from one tooth 94 to the next and each shifting movement, accomplished by one revolution of the shaft 88, will represent one basic value unit of the gasoline delivered.

A hubbed-disc-shaped adding head 102 is rotatably mounted upon the shaft 92 to lie adjacent to the stepper sprocket 93 and is normally interengaged with the sprocket 93 through a ball 103 which lies in a suitable orifice 104 near the peripheral edge of the adding head 102. This ball 103 is adapted to resiliently bear against the face of the sprocket 93 by a flat spring 105 mounted on the outer side of the head 102. A circumferential series of pockets 106 lie on the face of the sprocket 93 in radial registration with the teeth 94 and at the path of the ball 103 so that the ball will lodge in any given pocket. It follows that the adding head 102 is resiliently interengaged with the stepper sprocket 93 whenever the ball 103 rests in a pocket 106, and the head and sprocket will rotate together, but the adding head may also rotate step by step with respect to the sprocket 93 by a torque force sufficient to lift the ball 103 out of one pocket 106 and permit it to drop in another.

The hub of the adding head 102 extends outwardly on the shaft 92 to carry a tooth shifting sprocket 107 at its extended end. The teeth on the periphery of this shifting sprocket have the same pitch as the teeth 94 and pockets 106 on the stepper sprocket. A detent 108 is mounted upon the shaft 92 adjacent to this shifting sprocket to pivotally carry a pawl 109 at its extended end which directionally engages with the teeth of the shifting sprocket with suitable spring means, not shown, being adapted to hold the pawl against the sprocket teeth. The upwardly extending thrust bar 76 of the impulser 68 connects with the detent 108 as at pivot 110 whereby thrust movement of the bar 76, as from the action of coins deposited into the apparatus, as hereinbefore described, will rotate the shifting sprocket in selected steps about the stepper sprocket 93, one step for each value unit of the coins deposited. The operation of this accumulator 91 is thus to shift the adding head 102 in one direction by the coin-initiated actuation of the thrust bar 76 and to shift the adding head 102 the other direction by intermittent movement of the stepper sprocket 93 actuated by delivery of selected quantities of gasoline. For proper operation thereof, the apparatus must include control and check means to prevent improper accumulative movements from the deposit of coins, to prevent simultaneous movement of the respective adding and subtracting elements and to shut off the apparatus when the value of gasoline delivered is equal to the value of the coins deposited.

The first control element consists of the coin gate 111 mounted upon a pivot 112 on the inner wall of the door 61 to normally cover the coin slots 64, 64' and 64" and this gate includes suitable orifices 113, 113' and 113" which move in registration with the respective coin slots when the gate is shifted. Shifting of this gate is effected by depressing the armature of a solenoid 114 which contacts a bracket-like shelf 115 outstanding from the surface of the coin gate at one side of the pivot 112.

This gate control solenoid is first energized by a normally-open impulse switch 116 which is preferably a mercury-type tilt switch. It is mounted upon a rocker arm 117 pivotally connected to frame members forming the coin guide 65. The rocker arm 117 is connected to a plunger 118 which extends through the door 61 alongside the coin slots 64. A suitable spring 119 is adapted to extend the plunger 118 to hold the switch 116 to its normal open position, as soon as an operator releases the plunger. After the impulse of the switch 116 the solenoid 114 is adapted to be held in its energized state by other circuits, hereinafter described, until coin deposits are completed and the motor 29 is started to pump gasoline.

The motor 72 of the coin impulser apparatus is connected in parallel with the solenoid 114 to operate with the solenoid and whenever the coin gates are held open by the solenoid.

As the thrust bar 76 shifts to move the sprocket 107 responsive to dropping of coin, it is desirable to open the circuits which operate the pump motor 29 to prevent operation of the apparatus whenever the impulse is being added onto the adding head by the dropping of the coins. To accomplish this action, a normally-closed magnet-operated switch 120 is mounted on the accumulator frame 80' alongside the accumulator head 91. A control magnet 121 is mounted against the switch 120 on a rocker arm 122 which is pivotally carried on the frame 80'. The rocker arm includes an extended finger 123 which abuts against the pawl 109 with tension as from spring 124 being adapted to shift the rocker arm 122 and the magnet 121 away from the switch whenever the pawl 109 is shifted by movement of the thrust bar 76. This action opens the safety switch 120.

In using the gasoline pump, the delivery of fuel will reverse the adding head 102 to shift it to a seelcted stopping position and a stop lug 125 outstands from the base of the head 102 to contact bell crank levers, hereinafter described, as an incident of head rotation. The adding head may be rotated by movement of the thrust bar 76 to move the stop lug 125 away from these levers and in order to prevent complete rotation of the adding head 102 as by an excessive deposit of coins, the peripheral teeth on the adding head 102 are interrupted by a smooth surface 126. It is preferable to leave only a selected number of teeth, such a number representing some total deposit of coins representing a selected value, for example, ten dollars.

Referring to the circuit diagram as illustrated at FIG. 13, in order to better follow the operation of the control switches heretofore and hereafter described, a suitable power source 130 is provided to energize the pump and control circuits therefor, with the various circuits being terminated as at grounds 131. A motor drive circuit 132 extends from the power source to the gasoline pump motor 29. This circuit 132 includes three switches in series, a normally-closed manually-operated throw-out switch 133, a normally-open motor-switch relay 134 and the normally-open motor switch 31 at the pump. The throw-out switch 133 is a toggled-type blade adapted to normally close the circuit 132 but to alternatively close a normally open shunting circuit 132' which by-passes the motor switch relay 134 and thereby permits manual operation of the pump without use of the coin-controlled apparatus.

The motor switch relay 134 must be energized in order to close the circuit 132 to operate the motor 29 and this relay 132 is energized by a circuit 135 having several control switches therein in series which include, the normally-closed safety switch 120, a normally-open stop switch 136 and a second normally-closed safety-interlock switch 137. The circuit 135 is bifurcated to form a leg 138 which extends to the two-stage valve 24 as hereinafter described.

The stop switch 136 is mounted on the accumulator frame 80' and is operated by a pivotally mounted dog leg type rocker 139 having one leg connected with the switch and the other leg interposed in the path of the stop lug 125 on the head 102. The rocker is mounted on a bracket-supported shaft 140 adjacent to the accumulator head 91.

The safety-interlock switch 137 is normally closed and is adapted to open to prevent operation of the apparatus whenever the dials 35 and 36 of the gasoline pump computer head 33 are being set to zero. As an incident of such setting, the dial reset shafts 37 are shifted laterally as hereinbefore described, and one of these shafts 37 is adapted to bear against a shift rod 141 which extends into the case C. This rod 141 is resiliently held against the shaft 37 as by a spring 142. A detent 143 is adapted to bear against the rod 141 by pull of a spring 142' and is adapted to fall into a notch 144 whenever the rod 141 is shifted by movement of the reset shaft 37'. The reset shaft 39 includes a crank lever 145 which carries a pitman 146 connected to the detent 143 and is slidably connected to the lever 145 to release the detent at the end of the stroke of the lever. The opposite of the rod 141 extends into the case to abut against a rocker arm 147 pivotally mounted to a wall 60 of the case. This arm 147 carries a tilt-type safety switch 137 in a normally closed position and the extension of the rod 141 will tilt the arm 147 to open the switch. It follows that any partial depressing of the reset lever 41 will shift the shaft 37 to extend rod 141, and open switch 137. The rod will be held by the detent 143 and the switch held open until the reset lever 41 is completely depressed and the pump is ready for operation.

When the switches 133, 134 and 31 of the motor drive circuit 132 are closed to drive the motor 29 for pumping of gasoline, it is desirable that the coin gate 111 be closed to prevent deposit of coins while gasoline is being pumped and a closing circuit leg 148 is interconnected in circuit 132 adjacent to the motor 29 which is adapted to energize a solenoid 149 whenever the motor 29 is running. This solenoid opens a normally-closed switch 150 in a holding circuit 151 which connects with the gate solenoid 114 and the coin impulse motor 72. The holding circuit 151 includes a normally-open switch 152 at the gate solenoid 114 which closes whenever the solenoid 114 is energized. The initiating switch 116, hereinbefore described, is in a circuit 153 which also connects with the solenoid 114. It follows that when the gate solenoid 114 is energized momentarily by the switch 116, the switch 152 closes and circuit 151 continues to energize the solenoid 114 and the coin gate is thereby held open. This continues until the gasoline pump motor 29 commences to operate and at that time the circuit 148 energizes solenoid 149 to open the switch 150. The holding circuit 151 and solenoid 114 is then deenergized to close the coin gate.

In order to stop the pump by closing the control switch 136 it is desirable to decelerate the pump flow immediately before closure of the pump to avoid inertial effects of the fluid movement and motor rotation and to provide for accurate delivery of gasoline. A two-stage valve 24 is provided for this purpose and the valve is formed as a typical globe type valve having a dividing partition 154 across the flow passage with a large flow orifice 155 and a restricted flow orifice 156 therein, an adjustable head screw 157 being located at the restricted flow orifice. The flow through the orifices is adapted to be normally cut off by plungers 158 and 159, which are opened by the action of solenoids 160 and 161, as illustrated at FIG. 14. Both solenoids 160 and 161 are in the valve circuit 138, hereinbefore described, and whenever the safety switch 120 and the control switch 136 are closed, the circuit 138 is energized to open both of these valves. When the cut-off switch 136 is opened to stop the motor, both of the solenoids 160 and 161 are deenergized and the valve 24 is closed.

However, in operation of this unit it is desired for closure of the large flow orifice 155 ahead of the small flow orifice to avoid the inertial effects hereinbefore mentioned, and there is interposed in the circuit 138 a normally closed cut-off switch 162 which is preferably a magnet actuated type adapted to be opened by movement of a magnet against the side of the switch. This switch 162 is mounted on the accumulator frame 80' and a rocker arm 163 is pivotally mounted on frame 80' to lie alongside the switch 162 and alongside the stopping cam 90. A magnet 164 is affixed to the extended end of the rocker arm 163 to bear against the side of the switch 162 when it is depressed and a follower 165 is mounted on the rocker arm to bear against the cam 90 to normally hold the magnet 164 away from the switch. A spring 101 is adapted to resiliently hold the rocker arm with the follower against the arm. A drop notch 166 is formed in the periphery of this cam 90 to permit the rocker 163 to move the magnet against the switch.

An extended end 167 of the rocker arm 163 bears against the armature of a solenoid 168 to hold the follower out of the drop notch 166 until the armature of the solenoid 168 is depressed. The solenoid 168 is energized by a circuit 169 having a normally open retard switch 170 therein which lies alongside the cut-off switch 136 in the accumulator frame 80'. The retard switch is adapted to be closed by a bell crank lever 171 which is mounted on shaft 140 alongside the bell crank 139 and is adapted to be contacted by the lug 125 ahead of the contact of the bell crank lever 139 by the lug 125. The solenoid is thereby energized to permit it to drop its armature and at the proper instant on this last revolution of the cam 90 the follower 165 will drop into the notch 166 and permit the magnet 164 to open the switch 162 and thereby close the large flow orifice 155. The slight additional flow of gasoline will then be through the small flow orifice until the contact with the control switch 136 shuts off the entire flow.

To operate this coin controlled gasoline pump, it is usually recognized that a previous delivery of gasoline will leave quantities and values on the indicated dials 35 and 36. Several preliminary steps are thus necessary to prepare the apparatus, and with the circuit arrangements herein described, these steps may be accomplished in any selected sequential order. For example, the coin gate may be first opened by pushing plunger 118 to energize solenoid 114 and to start the coin impulse motor 72. A selected number of coins may then be dropped into the apparatus and their values indicated by stepping the adding head 102 of the accumulator. Next it will be necessary to lift the hose from its nozzle retaining pocket 42 and trip the reset lever 41 to clear the dials and turn on the pump motor switch 31. When fully and properly tripped, the reset lever will zero the dials 35 and 36 and turn on the switch 31. With coins properly deposited into the apparatus, the switches 136, 120 and 137 then permit the motor relay 134 to close to start the motor 29. This action closes the coin gate 111 and the operator may then withdraw a volume of gasoline from the pump which is proportional to the value of the coins deposited. This delivery of gasoline rotates the dials 35 and 36 in conventional manner and also shifts the stepper sprocket 93 to reverse the adding head 102, such movement continuing until the lug 125 on head 102 contacts the dog-leg lever 171. Then the solenoid 168 is energized to permit the follower 165 to drop in the stop cam notch 166 and near the end of the delivery the large flow orifice 155 is closed. Delivery continues through the small flow orifice 156 until the dog-leg lever 139 is contacted by the lug 125 to open switch 136 and shut off the apparatus.

While I have now described my invention in considerable detail, it is obvious that others skilled in the art can devise and build alternate and equivalent constructions which are within the spirit and scope of my invention. Hence, I desire that my protection be limited, not by the constructions illustrated and described, but only by the proper scope of the appended claims.

I claim:

1. In a coin-operated fluid-dispensing apparatus having a flow line, a pump in the line, meter computer in the line adapted to register the monetary value of fluid pumped through the line, means for selectively starting and stopping the pump, a coin receiving computer-actuated impulse-accumulator means adapted to add impulses responsive to deposit of coins and to subtract impulses responsive to actuation of the computer by delivery of fluid and means for stopping the pump whenever the subtraction of impulses balances the addition of impulses, wherein said accumulator means includes a pair of ratchet heads mounted upon a common shaft adjacent to each other, a set of ratchet teeth on a first head, a stepper stop adapted to resiliently bear against the teeth and prevent the head from rotating freely and permit rotation only in steps corresponding with the pitch of the teeth, a second set of ratchet teeth on said head having the same radial pitch as the first said set and a second stepper stop on the other head adapted to resiliently bear against the teeth of said second set and interengage the two heads to normally prevent rotation of the second head with respect to the said first head and permit rotation of the second head with respect to the first only in steps corresponding with the pitch of the teeth, a coin-operated impulse adding means adapted to rotate said second head in one direction by impulses corresponding with tooth pitch with the number of impulses being correlated with the coin value used for operation thereof, a meter-computer operated impulse subtracting means adapted to rotate said first head in the opposite direction by impulses corresponding with tooth pitch with each subtracting impulse being correlated with fluid delivery corresponding to the coin value of each adding impulse and said means for stopping the pump including a switch adapted to be contacted to initiate stopping of the pump and a lug on said second head adapted to contact said switch.

2. In the organization defined in claim 1 said impulse adding means including a third set of ratchet teeth on said second head having the same radial pitch as the other sets and a thrust bar carrying detent means adapted to engage the teeth of said third set.

3. In the organization defined in claim 1 said impulse subtracting means including a cam operatively interconnected with the meter computer and a follower adapted to engage the cam and carrying a thrust link adapted to contact a tooth of said first set of ratchet teeth.

References Cited in the file of this patent

UNITED STATES PATENTS

| 884,441 | Weser | Apr. 14, 1908 |
| 1,761,386 | Davis | June 3, 1930 |
| 2,223,146 | Yeomans | Nov. 26, 1940 |
| 2,329,306 | Thatcher | Sept. 14, 1943 |
| 2,366,469 | Andres | Jan. 2, 1945 |
| 2,433,689 | Fry | Dec. 30, 1947 |
| 2,451,776 | Rush | Oct. 19, 1948 |
| 2,573,112 | Schneckenburger | Oct. 30, 1951 |
| 2,777,555 | Banning | Jan. 15, 1957 |